United States Patent [19]

Hoops

[11] 4,003,508

[45] Jan. 18, 1977

[54] CYCLE PACK

[76] Inventor: Karl S. Hoops, Box 305 Rte. 6, Idaho Falls, Idaho 83401

[22] Filed: Aug. 13, 1975

[21] Appl. No.: 604,087

Related U.S. Application Data

[63] Continuation of Ser. No. 410,204, Oct. 26, 1973, abandoned.

[52] U.S. Cl. .............................. 224/32 R; 224/31; 190/60
[51] Int. Cl.² ............................................ B62J 7/04
[58] Field of Search .............. 297/DIG. 9; 224/5 R, 224/30 R, 32 A, 5 N, 8 R, 9, 31, 32 R, 39 R, 43; D12/119, 158; 280/202, 289; 190/18 R, 60

[56] References Cited

UNITED STATES PATENTS 2,390,673  12/1945  Wallace ........................... 224/8 R D219,761  1/1971  Akers et al. ...................... D12/158

FOREIGN PATENTS OR APPLICATIONS 434,153  10/1967  Switzerland ..................... 190/18 R
237,539  4/1945  Switzerland ........................ 224/8 R
553,487  5/1943  United Kingdom ............. 224/32 R
337,243  10/1930  United Kingdom ................. 190/60

Primary Examiner—Robert J. Spar
Assistant Examiner—Jerold M. Forsberg

[57] ABSTRACT

A cycle is provided for carrying luggage on a bicycle or motorcycle having a sissy bar. The pack comprises an enclosed container which carries a sleeve on its front wall for gripping said sissy bar to securely hold the pack to the cycle. The pack may be readily converted to a back pack.

1 Claim, 8 Drawing Figures

U.S. Patent  Jan. 18, 1977  Sheet 1 of 2  4,003,508
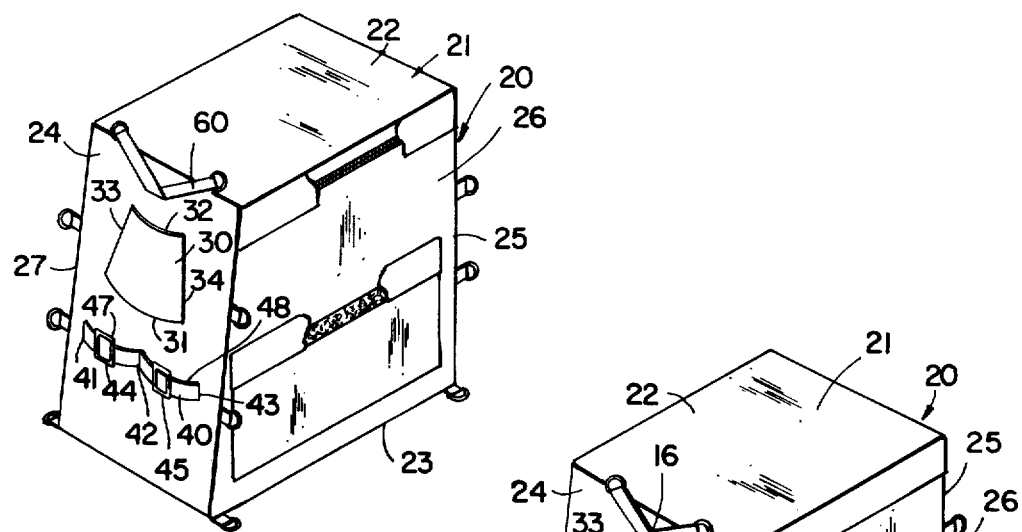
FIG_1
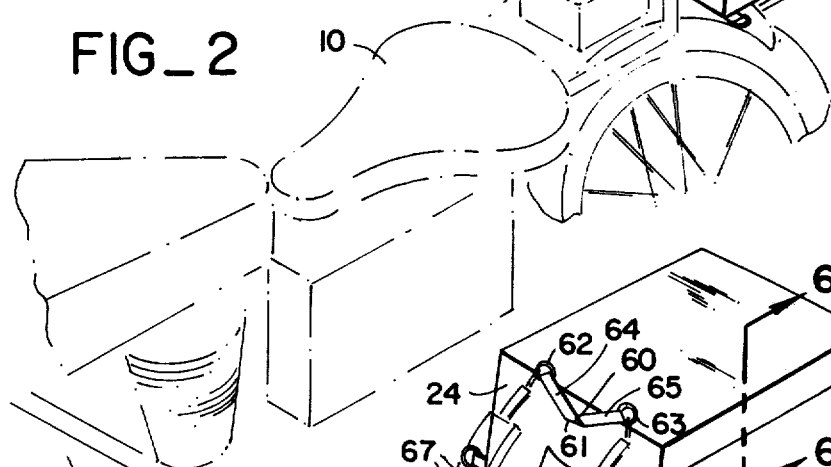
FIG_2
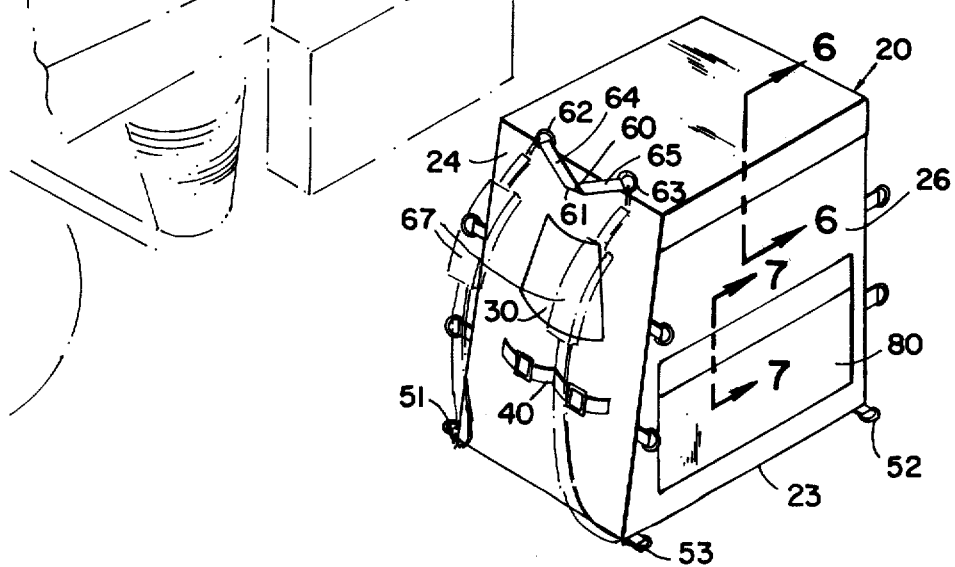
FIG_3

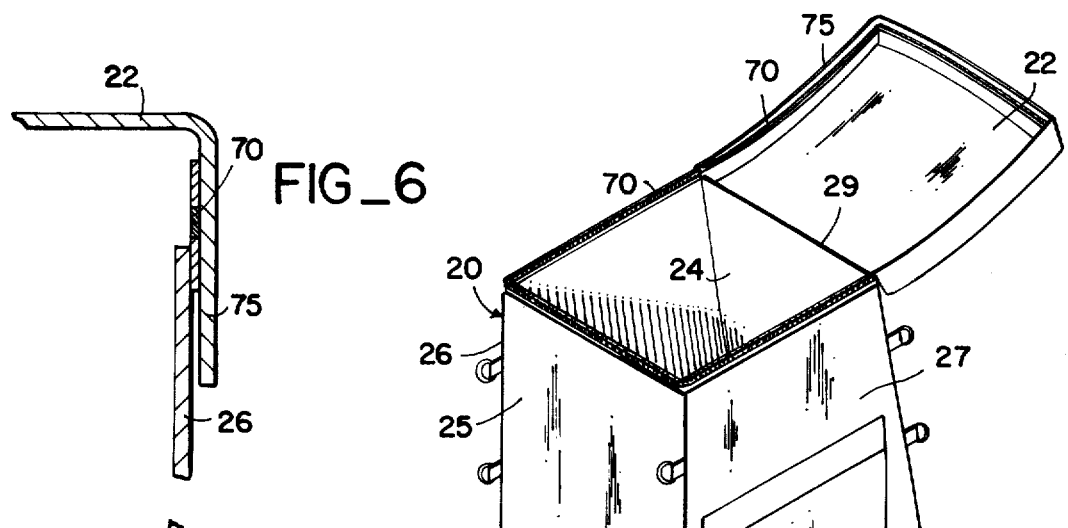
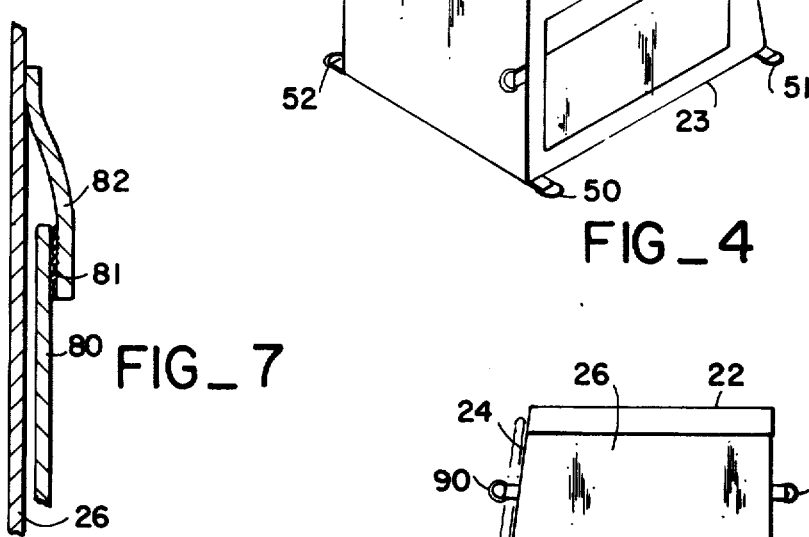
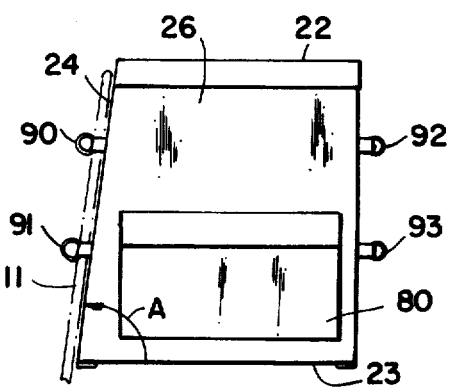
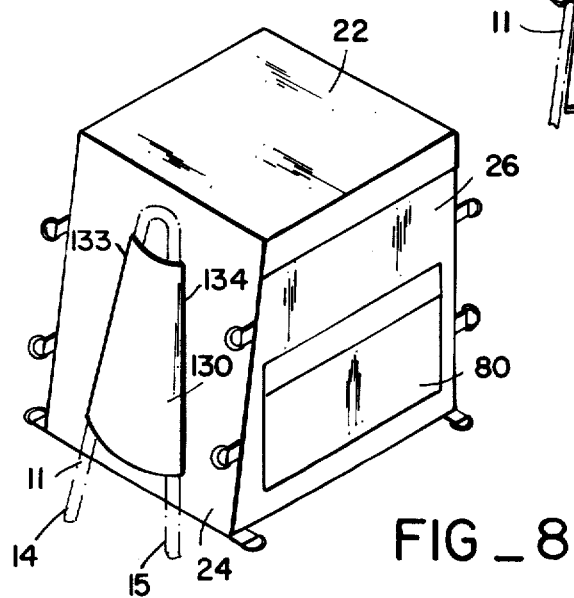

CYCLE PACK

This is a continuation of application Ser. No. 410,204 filed Oct. 26, 1973 now abandoned.

This invention pertains generally to luggage containers and, more specifically, to a pack which may be carried by motorcycles or bicycles and which may be readily converted to a back pack.

It is known in the prior art to carry luggage on motorcycles and bicycles by means of saddlebags which are carried at the rear of the cycle. The saddlebags provide only a limited storage volume.

The present invention pertains specifically to motorcycles and bicycles which have "sissy bars," which term refers to a pair of bars rigidly attached to the frame of the motorcycle or bicycle behind the seat thereof.

A primary object of the invention is to provide a cycle pack which may be readily mounted on to a cycle having a sissy bar.

A further object of the invention is to provide a cycle pack with a very large storage volume compared with conventional saddlebags and other conventional luggage carriers adapted for cycles.

A further object of the invention is to provide a cycle pack which may be readily converted to a back pack.

A further object of the invention is to provide a cycle pack of simple construction which is rugged, weatherproof and which provides a variety of methods of carrying luggage.

Further objects and advantages of the invention will become apparent from the following description of preferred embodiments and the drawings wherein:

FIG. 1 is a perspective view of one embodiment of the invention;

FIG. 2 is a perspective view of the pack of FIG. 1 shown mounted on a motorcycle;

FIG. 3 is a perspective view of the pack of FIG. 1 which has been converted for use as a back pack;

FIG. 4 is a perspective view of the pack of FIG. 1 shown with the top open;

FIG. 5 is a side elevational view of the pack of FIG. 1;

FIG. 6 is a sectional view along the line 6—6 of FIG. 3;

FIG. 7 is a sectional view along the line 7—7 of FIG. 3; and

FIG. 8 is a perspective view of a second embodiment of the invention.

Referring to FIGS. 1 and 2, a cycle pack 20 is shown for use on a motorcycle 10. Motorcycle 10 has a sissy bar 11 rigidly connected to the frame of the motorcycle and carried behind rear seat 12. A luggage surface 13 is carried by motorcycle 10 behind sissy bar 11.

Pack 20 comprises an enclosed container 21 having a top 22, a bottom 23, a front wall 24, a rear wall 25 and two side walls 26 and 27. Container 21 may be made from vinyl coated nylon material. The bottom 23 is rectangular in configuration and conforms to the shape and size of luggage surface 13. The closer that bottom 23 conforms to the shape and size of luggage surface 13, the more securely pack 20 is secured or stabilized on cycle 10. A sleeve 30 is carried by front wall 24 for gripping sissy bar 11. Since the typical sissy bar 11 comprises two arms 14 and 15 which converge at their uppermost tip 16, sleeve 30 is wider at its lowermost portion 31 than at its uppermost portion 32. The edges 33 and 34 of sleeve 30 may be sewn to front wall 24 of pack 20. Edges 33 and 34 of sleeve 30 are inclined at the same angle at which arms 14 and 15 of sissy bar 11 are inclined.

When bottom 23 of pack 20 rests on said luggage surface, sleeve 30 firmly grips sissy bar 11 as shown in FIG. 2. In this position, the frictional engagement of bottom 23 with luggage surface 13 plus the gripping force between sleeve 30 and sissy bar 11 stabilizes or secures pack 20 on motorcycle 10.

Restraining belt 40 may be provided which is carried by front wall 24 beneath sleeve 30. Restraining belt 40 may be a canvas belt sewn in front wall 24 at points 41, 42 and 43. Buckles 44 and 45 are provided in the sections 47 and 48 of belt 40. As shown in FIG. 2, restraining belt 40 engages sissy bar 11 to more securely attach pack 20 to motorcycle 10. Belt 40 is attached to sissy bar 11 by unbuckling buckles 44 and 45, sliding sleeve 30 downwardly over sissy bar 11 and when bottom 23 is resting on luggage surface 13, sections 47 and 48 of belt 40 are tightened and buckles 44 and 45 are closed.

As shown in FIGS. 3 and 4, a plurality of eyelets 50, 51, 52 and 53 are attached to the four corners of bottom 13. Tie lines may be passed through these eyelets to more securely attach pack 20 to motorcycle 10.

Referring to FIGS. 1 and 2, sleeve 30 may comprise elastic material for resiliently gripping sissy bar 11.

Referring to FIG. 3, eyelets 51 and 53 are attached to the front edge of bottom 13 and connecting means 60 is carried at the top of front wall 24. Connecting means 60 may be a canvas belt sewn at edge 61 to front wall 24 and having eyelets 62 and 63 at the ends of arms 64 and 65. A harness 67 may be removably mounted on eyelets 51 and 53 and connecting means 60 to readily convert said cycle pack to a back pack.

As shown in FIG. 4, top 22 is permanently attached to front wall 24 along edge 29 as by sewing. A zipper 70 removably connects top 22 to side walls 26, 27 and rear wall 25. A protective flap 75 is provided which is carried by top 22. Flap 75 may simply by an extension of top 22 as shown in FIG. 6. Protective flap 75 extends downwardly over zipper 70 when pack 20 is closed to protect the interior of pack 20 from the elements.

As shown in FIGS. 3 and 7, a pocket 80 is carried by side wall 26 having access means 81 at the top thereof and a protective cover 82 extending downwardly over said access means to protect the interior of pocket 80 from the elements. Access means 81 may be either a zipper or other suitable closure means such as pressure sensitive closure material.

As shown in FIG. 5, a plurality of eyelets 90, 91 and 92 and 93 may be attached to side wall 26 and similar eyelets attached to side wall 27 through which tie lines may be passed to attach various luggage items to the exterior of said pack. Angle A is the degree of inclination of sissy bar 11 shown in phantom in FIG. 5. Front wall 24 is inclined relative to bottom 23 at that same angle A so that front wall 24 is in a plane parallel with the plane defined by arms 14 and 15 of sissy bar 11.

The embodiment shown in FIG. 8 may be carried by a motorcycle or bicycle having a sissy bar 11 but not a luggage rack. Sleeve 130 is provided which is firmly attached to front wall 24 as by sewing along edges 133 and 134. Edges 133 and 134 are inclined at the same angle as the arms of sissy bar 11 so that sleeve 130 firmly grips arms 14 and 15 when the pack is placed on sissy bar 11. Edges 134 and 135 of sleeve 130 extend vertically more than half the distance from the bottom 23 to the top 22 of the pack to provide suitable carrying strength. Sleeve 130 may be made of elastic material to firmly grip sissy bar 11. In addition, the use of elastic material for sleeve 130 facilitates the use of the pack on cycles with different sized sissy bars. The inner portions of sleeve 130 which contact arms 14 and 15 of sissy bar 11 may be lined or impregnated with a suitably tacky substance to reduce slippage of the pack relative to sissy bar 11.

Although preferred embodiments of this invention have been illustrated and described, various modifications and changes may be resorted to without departing from the spirit of the invention or the scope of the attached claims, and each of such modifications and changes is contemplated.

I claim:

1. A convertible pack for use as a back pack and on a cycle with an inverted V-shaped sissy bar having a pair of inclined arms which may be readily connected to and removed from said sissy bar comprising:

an enclosed container having a top, a bottom, a front wall, a rear wall and two side walls; and a resilient, inverted V-shaped sleeve, open at its top and bottom, the edges of said sleeve being inclined at the same angle as the arms of said sissy bar, and spaced apart a distance such that said sleeve is stretched as it slides downwardly over said sissy bar, and carried by said front wall for sliding downwardly over said sissy bar a distance proportional to the loaded weight of said pack and for resiliently gripping the inclined arms of said sissy bar with a force proportional to the loaded weight of said pack, thereby simultaneously supporting the weight of said pack and stabilizing said pack to reduce lateral sway thereof.

* * * * *